US012769523B2

(12) United States Patent
(10) Patent No.: US 12,769,523 B2
(45) Date of Patent: Oct. 20, 2026

Bellamy et al.

(54) METHODS AND SYSTEMS FOR UNIVERSAL SPREADSHEET ADAPTERS

(71) Applicants: Jason Bellamy Alfred Bellamy, Vancouver (CA); Josh Holat, Boston, MA (US)

(72) Inventors: Jason Bellamy Alfred Bellamy, Vancouver (CA); Josh Holat, Boston, MA (US)

( * ) Notice: Subject to any disclaimer, the term of this patent is extended or adjusted under 35 U.S.C. 154(b) by 256 days.

(21) Appl. No.: 18/631,039

(22) Filed: Apr. 9, 2024

(65) Prior Publication Data

US 2025/0315225 A1 Oct. 9, 2025

(51) Int. Cl.
*G06F 8/40* (2018.01)
*G06F 8/41* (2018.01)

(52) U.S. Cl.
CPC .................................... *G06F 8/41* (2013.01)

(58) Field of Classification Search
CPC .................................... G06F 8/41; G06F 8/71
See application file for complete search history.

(56) References Cited

U.S. PATENT DOCUMENTS 7,840,889 B2 * 11/2010 Mantuano ................. G06F 8/36 715/217
2017/0337233 A1 * 11/2017 Fawcett .................. G06F 40/18
2020/0285694 A1 * 9/2020 Nield .................. G06F 9/45504

* cited by examiner

*Primary Examiner* — Hanh Thi-Minh Bui

(57) ABSTRACT

In one aspect, a universal spreadsheet adapter system comprising: wherein the universal spreadsheet adapter system comprises a software architecture and a build system design for a development and integration of a plurality of third-party spreadsheet software applications; one or more spreadsheet adapter source codes of the plurality of third-party spreadsheet software applications, wherein the one or more spreadsheet adapter source codes are configured to implement one more functionalities from one or more functions exposed by a third-party spreadsheet; a spreadsheet interface configured to obtain each spreadsheet adapter source code whenever an interaction with a third-party spreadsheet is performed; a builder system configured to: obtain each spreadsheet adapter source code and generate provide a compiled production-ready build of each spread application, ands obtain a parameterized request.

8 Claims, 7 Drawing Sheets

600

700

METHODS AND SYSTEMS FOR UNIVERSAL SPREADSHEET ADAPTERS

CLAIMS OF PRIORITY

This application claims priority to U.S. Provisional Patent Application No. 63/537,735, filed on Sep. 11, 2023 and titled METHODS AND SYSTEMS FOR UNIVERSAL SPREADSHEET ADAPTERS. This provisional patent application is hereby incorporated by reference in its entirety.

BACKGROUND

There is a need for a spreadsheet-native platform (e.g. a Financial Planning and Analysis (FP & A) platform, etc.) that helps strategic finance teams build multi-scenario plans, track performance, and drive business decisions using the spreadsheets they've come to rely on. By integrating automation and workflows into the tools users live in every day, including Excel and Google Sheets, Cube enables FP & A teams to quickly and confidently plan for the unexpected and stay ahead of changes. Accordingly, improvements to spreadsheet platforms that ensure the experience is consistent across all types of spreadsheets are desired.

SUMMARY OF THE INVENTION

In one aspect, a universal spreadsheet adapter system comprising: wherein the universal spreadsheet adapter system comprises a software architecture and a build system design for a development and integration of a plurality of third-party spreadsheet software applications; one or more spreadsheet adapter source codes of the plurality of third-party spreadsheet software applications, wherein the one or more spreadsheet adapter source codes are configured to implement one more functionalities from one or more functions exposed by a third-party spreadsheet; a spreadsheet interface configured to obtain each spreadsheet adapter source code whenever an interaction with a third-party spreadsheet is performed; a builder system configured to: obtain each spreadsheet adapter source code and generate provide a compiled production-ready build of each spread application, and obtain a parameterized request, wherein the parameterized request contains a system identifier that is made to a build pipeline, wherein the parameterized request instructs builder system to start a compilation for a specific spreadsheet system target, obtain another application source code written in a language supported by the spreadsheet system target and containing logic to integrate with the third-party spreadsheet software but maintained separately and obtained from the parameterized request, wherein the build system compiles and generates a plurality of production-ready builds of the other application, and wherein production ready builds are minified and compiled source code containing the application source code specific to the spreadsheet target and capable of operating inside of the third-party spreadsheet target environment.

Figure 1:
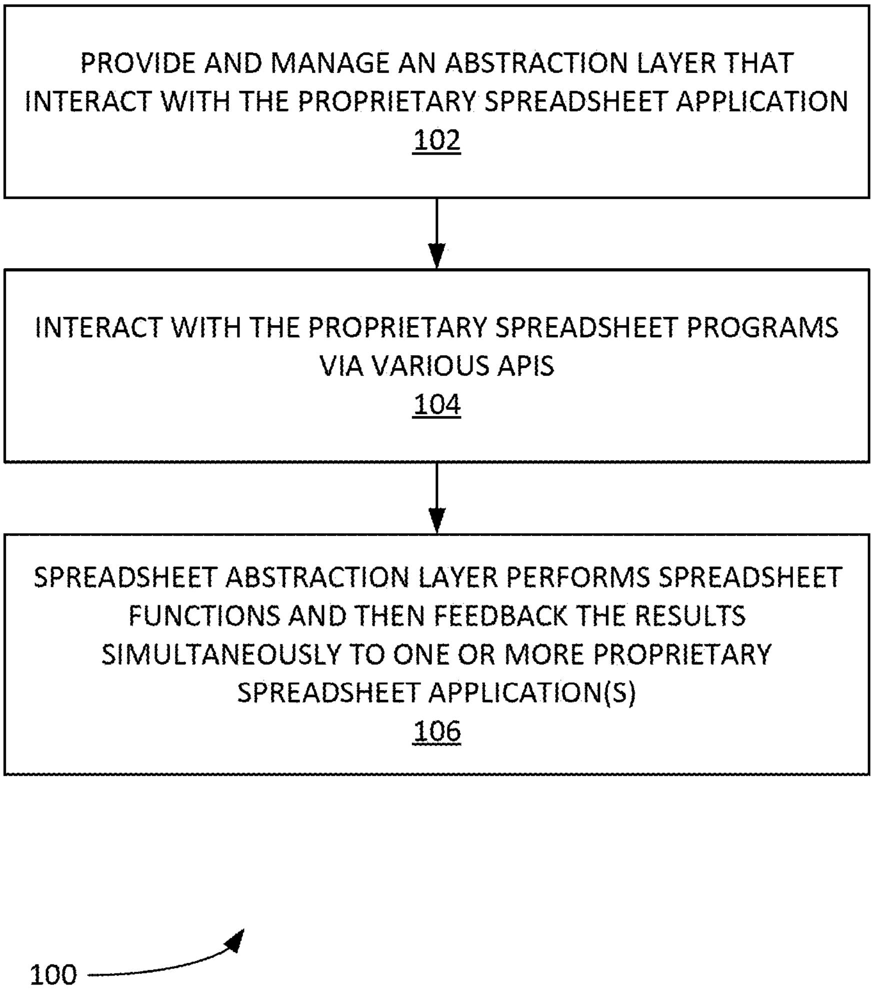
FIG. 1 illustrates an example process for implementing a universal spreadsheet adapter system, according to some embodiments.

The FIGURES described above are a representative set and are not an exhaustive with respect to embodying the invention.

DESCRIPTION

Disclosed are a system, method, and article of manufacture for universal spreadsheet adapters. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) is a way for two or more computer programs to communicate with each other. An API can provide a type of software interface, offering a service to other pieces of software.

Code base is the complete body of source code for a software program, component or system. The code base can include the source files needed to compile the software, etc.

Google Sheets® is a spreadsheet application included as part of the free, web-based Google Docs Editors suite offered by Google.

Microsoft Excel is a spreadsheet editor developed by Microsoft. Excel includes calculation or computation capabilities, graphing tools, pivot tables, and a macro programming language called Visual Basic for Applications (VBA).

NPM is a package manager for the JavaScript runtime environment Node.js. It is noted that other package managers can be used in other example embodiments.

Spreadsheet is a computer application for computation, organization, analysis and storage of data in tabular form. Spreadsheets operate on data entered in cells of a table. Each cell may contain either numeric or text data, or the results of formulas that automatically calculate and display a value based on the contents of other cells.

EXAMPLE SYSTEMS AND METHODS

It is noted that implementation and usage patterns for application programming interfaces (APIs) for third-party spreadsheet software applications can vary greatly, allowing for potentially undesirable development practices and performance issues to surface. Accordingly, in the present invention, a universal spreadsheet adapter system is implemented and configured to increase efficiency in the development process and reduce unpredictability in application usage.

FIG. 1 illustrates an example process 100 for implementing a universal spreadsheet adapter system, according to some embodiments. Process 100 provides an agnostic infrastructure that can interact with any proprietary spreadsheet application (e.g. Google Sheets®, Microsoft Excel®, Jspreadsheet, etc.). In step 102, process 100 provides and manages an abstraction layer that interacts with the proprietary spreadsheet application. This abstraction can include various spreadsheet functionalities and interact with the spreadsheet application themselves. Process 100 can migrate data from one propriety spreadsheet program to another. Process 100 uses a single code base as well to interact between two or more proprietary spreadsheet applications. The spreadsheet abstraction layer is a single codebase that then can be used to update the spreadsheet content a specific spreadsheet application running Sheets®, Excel®, etc.

Process 100 can interact with the proprietary spreadsheet programs via various APIs in step 104. Example API methods are discussed in process 400.

In step 106, the spreadsheet abstraction layer can perform spreadsheet functions and then feedback the results simultaneously to one or more of the proprietary spreadsheet application. For example, a template in a Sheets application can include various formatting, borders, etc. properties. These can be abstracted to the spreadsheet abstraction layer by process 100. The spreadsheet abstraction layer can then publish the template to an Excel spreadsheet application. In this way, the two sheets application look and feel can be identical to the Excel spreadsheet application.

It is noted that a build system of the code base can write the code and deploy it to n-number of spreadsheets via an application proprietary spreadsheet API.

Figure 2:
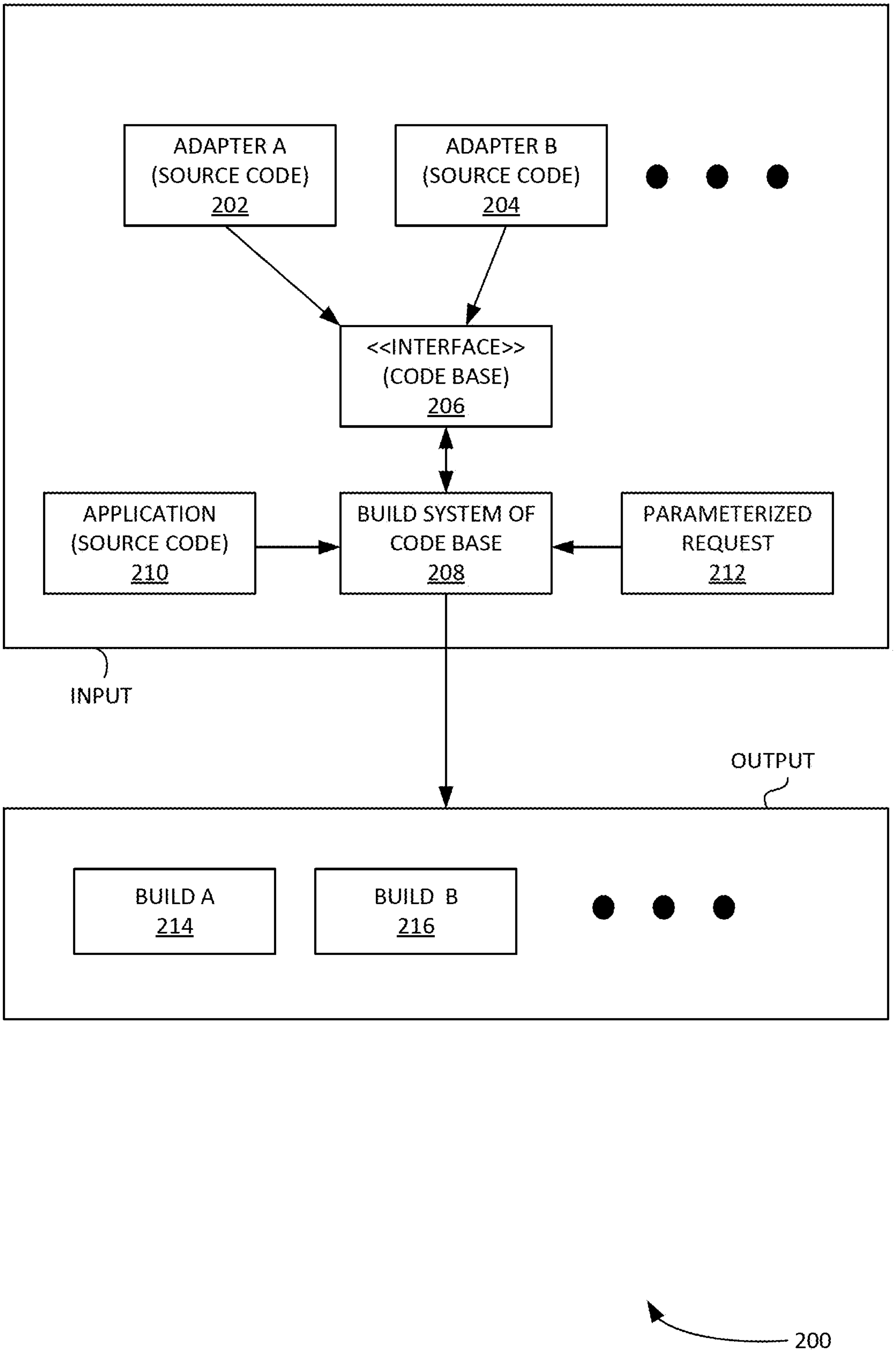
FIG. 2 illustrates an example universal spreadsheet adapter system, according to some embodiments.

FIG. 2 illustrates an example universal spreadsheet adapter system 200, according to some embodiments. Universal spreadsheet adapter system provides the software architecture and a build system design for the development and integration of multiple versions of third-party spreadsheet software applications. Universal spreadsheet adapter system 200 includes spreadsheet adapter source code (e.g. Adapter A (source code) 202, Adapter B (source code) 204, Application source code 210, etc.) that implements functionality from the third-party spreadsheet API endpoints and/or one or more functions exposed by a third-party spreadsheet (e.g. these can functions available to use that can be called and interacted with that expose the underlying spreadsheet functionality). Universal spreadsheet adapter system 200 provides a spreadsheet interface that is used throughout the application whenever an interaction with a third-party spreadsheet is required. Universal spreadsheet adapter system 200 includes application source code 206. The build system 208 can be used to compile the production-ready builds of the application (e.g. build A 214, build B 216, etc.). Builder system 208 can provide the compiled production-ready build of the application. Parameterized request 210 contains a system identifier that is made to the build pipeline. Parameterized request 210 instructs builder system 208 to start compilation for a specific spreadsheet system target. Universal spreadsheet adapter system 200 can used process 100, processes 300-500.

Figure 3:
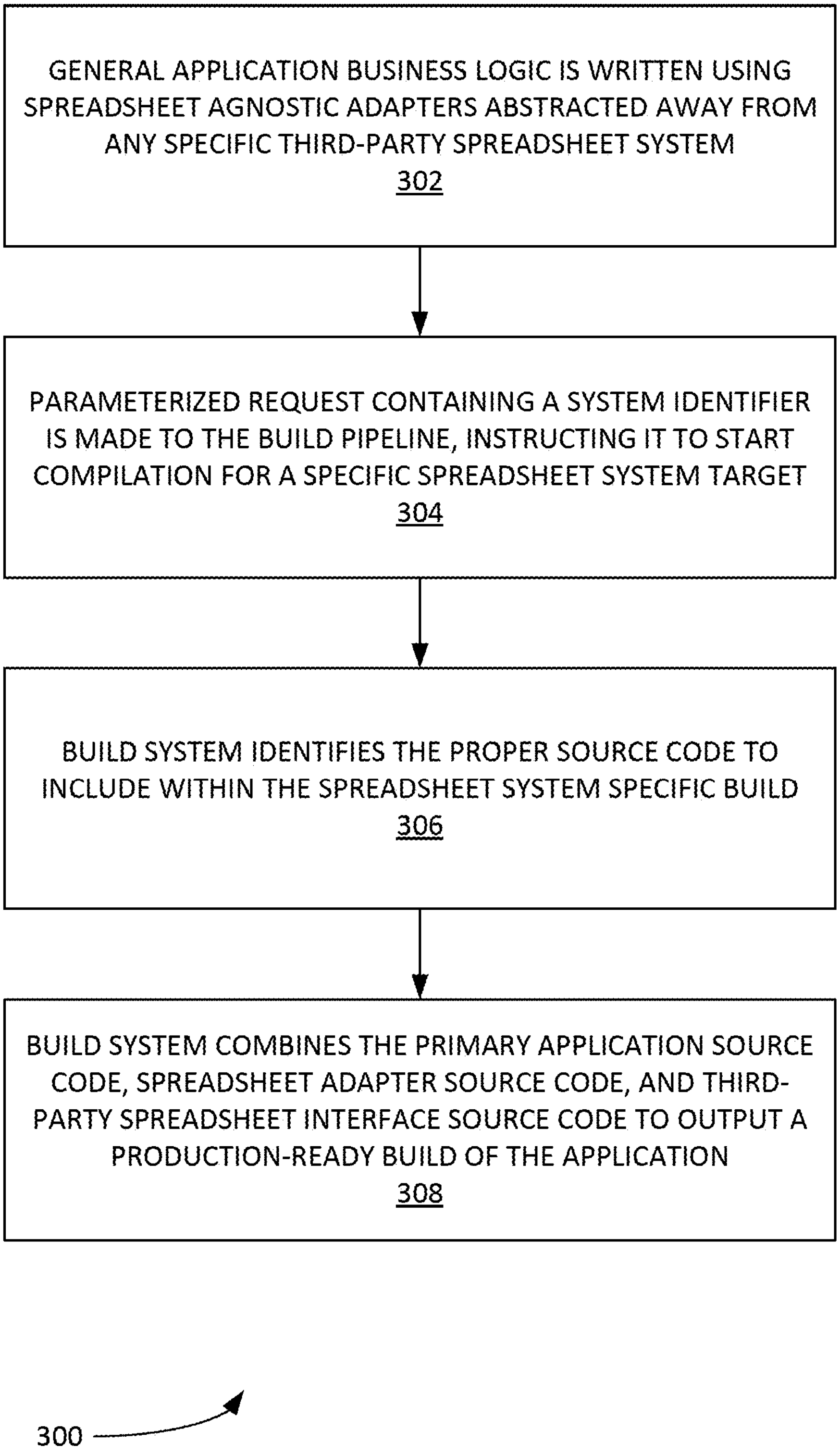
FIG. 3 illustrates an example process for implementing a universal spreadsheet adapter system, according to some embodiments.

FIG. 3 illustrates an example process 300 for implementing a universal spreadsheet adapter system, according to some embodiments. Process 300 can manage universal spreadsheet adapter system 200. Process 300 provides an example system specific implementation of common spreadsheet logic (e.g. reading and writing data to and from cells within the spreadsheet) is created for each third-party spreadsheet being targeted by the build system. In step 302, a general application business logic is written using spreadsheet agnostic adapters abstracted away from any specific third-party spreadsheet system.

In step 304, a parameterized request containing a system identifier is made to the build pipeline, instructing it to start compilation for a specific spreadsheet system target. The build system loads the relevant environment variables associated with the build target from a secure storage location (e.g. AWS Secrets Manager and/or any cloud-storage that enables a user to manage, retrieve, and rotate database credentials, application credentials, OAuth tokens, API keys, and other secrets throughout their lifecycles, etc.) and writes them to a configuration file. The build system installs the relevant third-party dependency packages for the application via an open-source system (e.g. NPM package manager, etc.).

In step 306, the build system identifies the proper source code to include within the spreadsheet system specific build. The build system identifies the third-party spreadsheet specific adapter source code for the build system target and imports it into the overall build package. The build system retrieves and prepares the primary application source code for compilation. This is common logic shared across the built product regardless of the target third party spreadsheet system in use.

In step 308, the build system combines the primary application source code, spreadsheet adapter source code, and third-party spreadsheet interface source code to output a production-ready build of the application.

Figure 4:
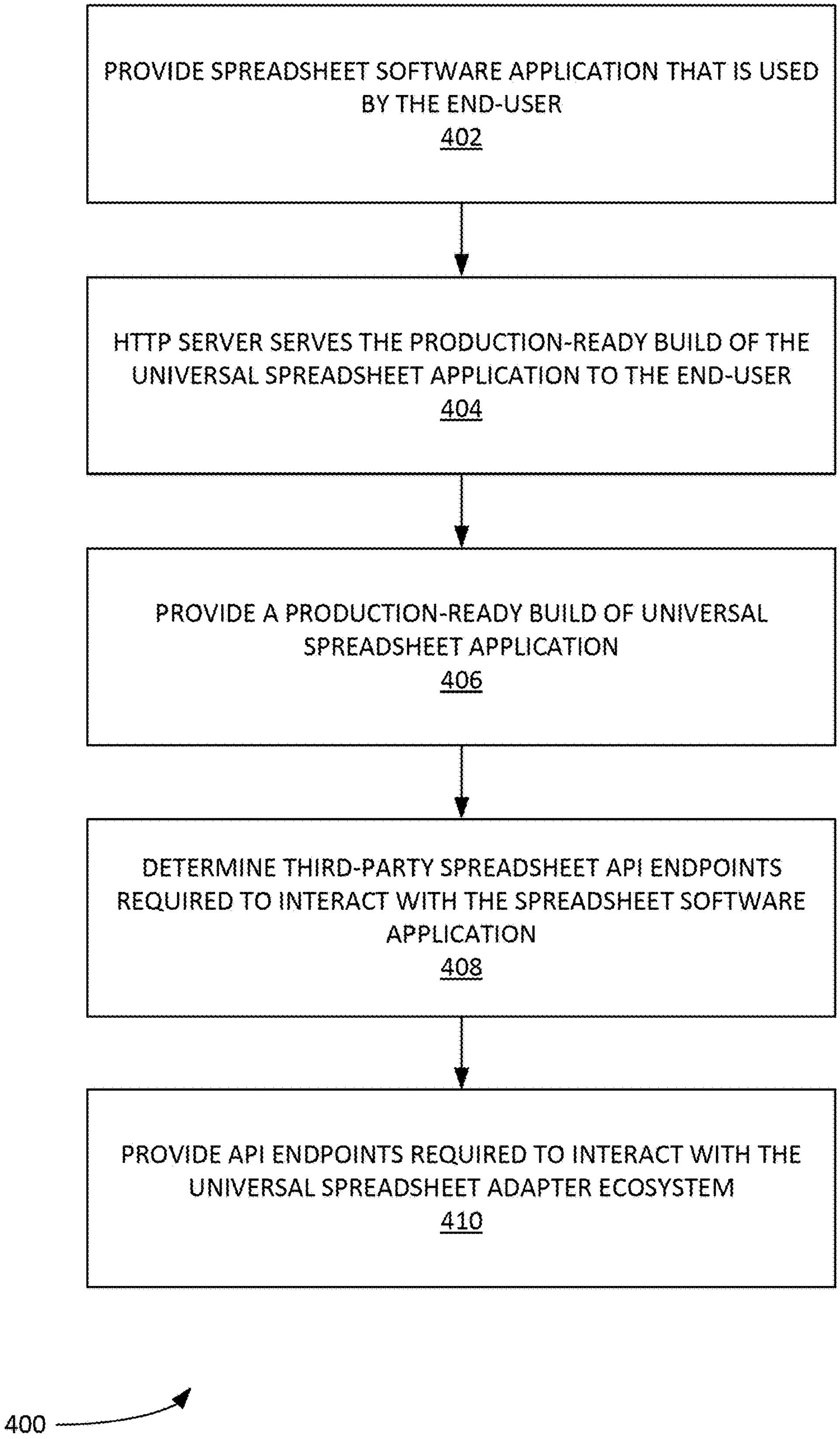
FIG. 4 illustrates an example process of a client/server request flow, according to some embodiments.

FIG. 4 illustrates an example process 400 of a client/server request flow, according to some embodiments. Process 400 enables the serving of multiple spreadsheet application versions to the end-user. In step 402, process 400 can provide the spreadsheet software application that is used by the end-user (e.g. Microsoft Excel®, Google Sheets®, etc.). In step 404, an HTTP server serves the production-ready build of the universal spreadsheet application to the end-user.

In step 406, process 400 provides a production-ready build of universal spreadsheet application. In step 408, process 400 determines the third-party spreadsheet API endpoints and/or one or more functions exposed by a third-party spreadsheet required to interact with the spreadsheet software application (e.g. Microsoft Excel®, Google Sheets®, etc.). In step 410, process 400 provides the API endpoints and/or one or more functions exposed by a third-party spreadsheet required to interact with the universal spreadsheet adapter ecosystem (e.g. system 200, other universal spreadsheet adapter systems, etc.).

Figure 5:
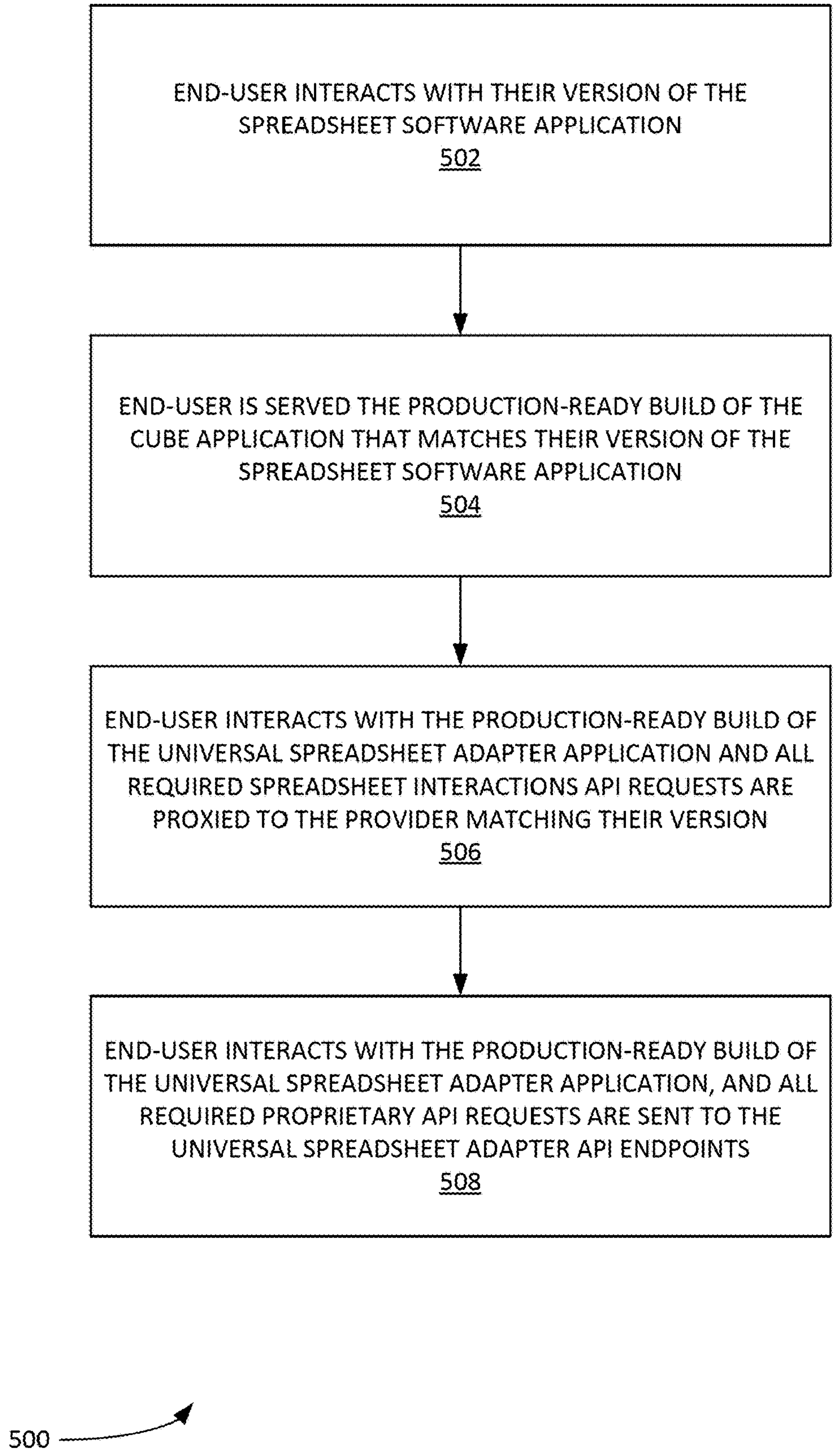
FIG. 5 illustrates an example process for implementing a universal spreadsheet adapter application, according to some embodiments.

FIG. 5 illustrates an example process 500 for implementing a universal spreadsheet adapter application, according to some embodiments. In step 502, the end-user interacts with their version of the spreadsheet software application. In step 504, the end-user is served the production-ready build of the universal spreadsheet adapter application that matches their version of the spreadsheet software application. In step 506, the end-user interacts with the production-ready build of the universal spreadsheet adapter application and all required spreadsheet interactions API requests are proxied to the provider matching their version. In step 508, the end-user interacts with the production-ready build of the universal spreadsheet adapter application, and all required proprietary API requests are sent to the universal spreadsheet adapter API endpoints and/or one or more functions exposed by a third-party spreadsheet.

Figure 6:
FIGS. 6-7 illustrate example screenshot web portal for implementing universal spreadsheet adapter configurations, according to some embodiments.
Figure 7:
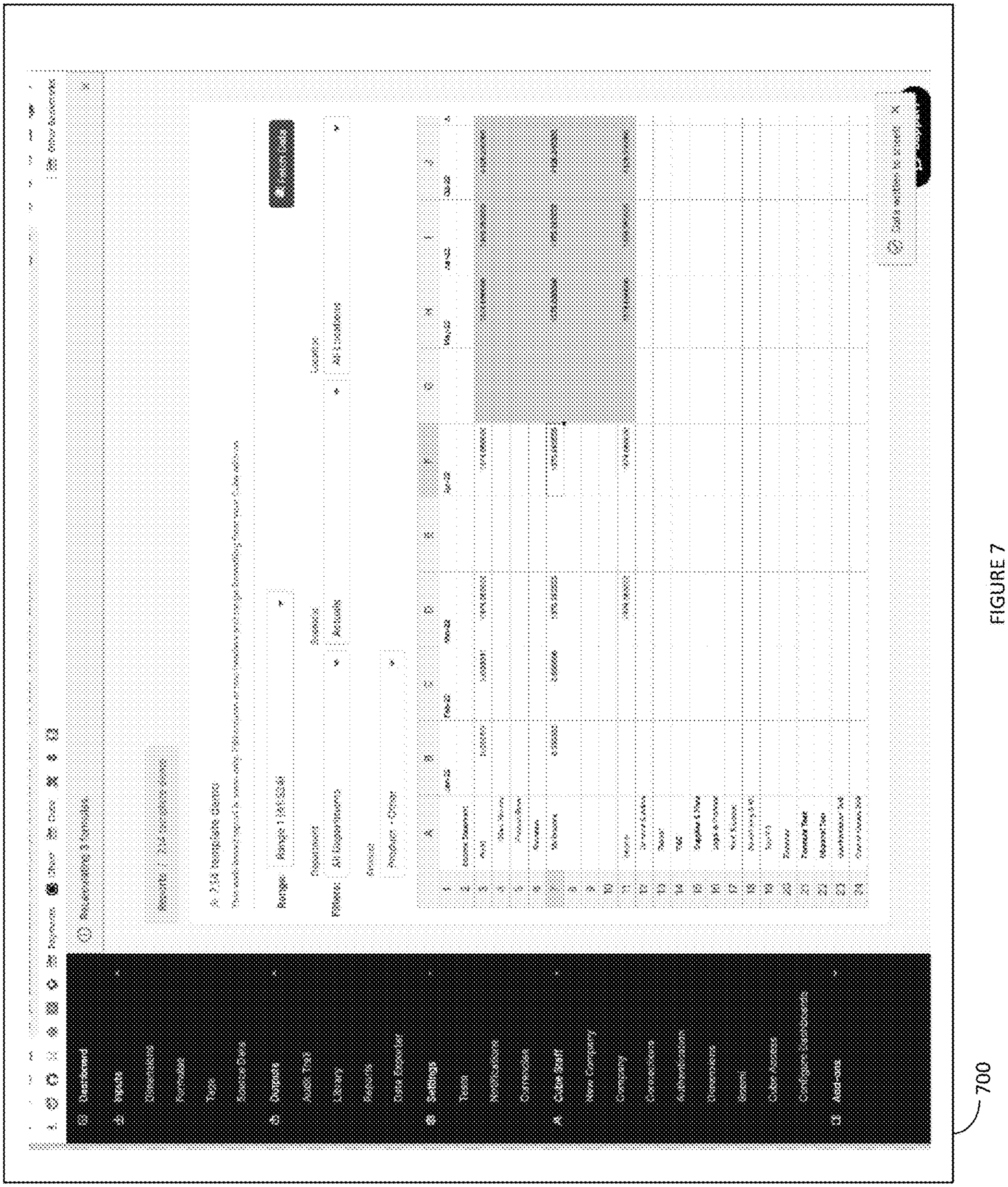

FIGS. 6-7 illustrate example screenshot web portal 600-700 for implementing universal spreadsheet adapter configurations, according to some embodiments. In one example, the web portal 600 can be used to interact with web-based spreadsheets, as shown in screen shot 700.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed:

1. A universal spreadsheet adapter system comprising:

a non-transitory machine readable-medium;

one or more hardware chips, wherein the one or more hardware chips are configured to perform operations comprising:

executing a build system configured for development and integration of a primary application with a plurality of third-party spreadsheet software applications;

maintaining a plurality of sets of spreadsheet adapter source code for the plurality of third-party spreadsheet software applications, wherein each set of spreadsheet adapter source code corresponds to a respective third-party spreadsheet software application and is configured to implement one or more functionalities based on one or more functions exposed by the respective third-party spreadsheet software application;

providing a spreadsheet interface configured to obtain a corresponding set of spreadsheet adapter source code when an interaction with a selected third-party spreadsheet software application is performed;

obtaining, by the build system, a parameterized request containing a system identifier provided to a build pipeline, wherein the parameterized request instructs the build system to start compilation for a specific spreadsheet system target corresponding to the selected third-party spreadsheet software application;

obtaining, by the build system, primary application source code written in a language supported by the specific spreadsheet system target, wherein the primary application source code contains logic for integration with the selected third-party spreadsheet software application and is maintained separately from the corresponding set of spreadsheet adapter source code;

identifying, by the build system, source code to include within a spreadsheet-system-specific build for the specific spreadsheet system target;

identifying, by the build system, third-party-spreadsheet-specific adapter source code for the specific spreadsheet system target;

importing, by the build system, the third-party-spreadsheet-specific adapter source code into an overall build package;

retrieving and preparing, by the build system, the primary application source code for compilation, wherein the primary application source code comprises common logic shared across a built product regardless of a target third-party spreadsheet software application in use;

combining, by the build system, the primary application source code, the third-party-spreadsheet-specific adapter source code, and third-party spreadsheet interface source code to generate a production-ready build of the primary application;

generating, by the build system, a plurality of production-ready builds of the primary application for different spreadsheet system targets corresponding to different third-party spreadsheet software applications;

wherein each production-ready build comprises minified and compiled source code containing application source code specific to a corresponding spreadsheet system target and capable of operating inside a target environment associated with a corresponding third-party spreadsheet software application; and wherein general application business logic of the primary application is written using spreadsheet-agnostic adapters abstracted away from any specific third-party spreadsheet software application.

2. The universal spreadsheet adapter system of claim 1, wherein the plurality of sets of spreadsheet adapter source code comprises a first set of adapter source code for a first third-party spreadsheet software application, a second set of adapter source code for a second third-party spreadsheet software application, and a third set of adapter source code for a third third-party spreadsheet software application.

3. The universal spreadsheet adapter system of claim 2, wherein the first third-party spreadsheet software application comprises a MICROSOFT EXCEL spreadsheet application.

4. The universal spreadsheet adapter system of claim 2, wherein the second third-party spreadsheet software application comprises a GOOGLE SHEETS spreadsheet application.

5. The universal spreadsheet adapter system of claim 2, wherein the third third-party spreadsheet software application comprises a JSPREADSHEET spreadsheet application.

6. The universal spreadsheet adapter system of claim 1, wherein the spreadsheet interface is configured to determine the one or more functions exposed by the respective third-party spreadsheet software application that are required to interact with the respective third-party spreadsheet software application.

7. The universal spreadsheet adapter system of claim 1, wherein a web portal is used to interact with one or more web-based spreadsheets associated with at least one of the plurality of third-party spreadsheet software applications.

8. The universal spreadsheet adapter system of claim 1, wherein the one or more functions exposed by the respective third-party spreadsheet software application comprise callable functions exposed by the respective third-party spreadsheet software application to provide access to underlying spreadsheet functionality.

* * * * *